(12) United States Patent
Mital et al.

(10) Patent No.: US 8,726,234 B2
(45) Date of Patent: May 13, 2014

(54) USER-CUSTOMIZED EXTENSIONS FOR SOFTWARE APPLICATIONS

(75) Inventors: Vijay Mital, Sammamish, WA (US); Tim Getsch, Redmond, WA (US); Andrew Robert Miller, Issaquah, WA (US); Erik Jon Rucker, Seattle, WA (US); Alexander Stojanovic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1953 days.

(21) Appl. No.: 11/465,692

(22) Filed: Aug. 18, 2006

(65) Prior Publication Data

US 2008/0127032 A1 May 29, 2008

(51) Int. Cl.
*G06F 9/44* (2006.01)

(52) U.S. Cl.
USPC ............ 717/115; 717/110; 717/113; 717/114

(58) Field of Classification Search
None
See application file for complete search history.

(56) References Cited

U.S. PATENT DOCUMENTS

| | | | |
|---|---|---|---|
| 6,662,355 B1 | 12/2003 | Caswell et al. | 717/103 |
| 6,763,353 B2 | 7/2004 | Li et al. | 707/4 |
| 6,868,413 B1 * | 3/2005 | Grindrod et al. | 706/59 |
| 6,901,380 B1 | 5/2005 | Bremers | 705/27 |
| 6,965,902 B1 | 11/2005 | Ghatate | 707/103 |
| 7,007,266 B1 | 2/2006 | Isaacson | 717/100 |
| 7,720,879 B2 * | 5/2010 | Tsyganskiy et al. | 707/803 |
| 7,849,106 B1 * | 12/2010 | Agrawal et al. | 707/803 |
| 2001/0044738 A1 | 11/2001 | Elkin et al. | 705/8 |
| 2002/0147644 A1 * | 10/2002 | Subramanian et al. | 705/14 |
| 2002/0169650 A1 | 11/2002 | Dougherty et al. | 705/8 |
| 2004/0015811 A1 | 1/2004 | Freitas et al. | 717/100 |
| 2004/0205765 A1 * | 10/2004 | Beringer et al. | 719/311 |
| 2005/0005259 A1 | 1/2005 | Avery et al. | 717/103 |
| 2005/0086075 A1 | 4/2005 | Kaehler et al. | 705/2 |
| 2005/0209996 A1 | 9/2005 | Stewart | 707/1 |
| 2006/0101445 A1 * | 5/2006 | Carbajales et al. | 717/165 |

OTHER PUBLICATIONS

An Environment for Reusing Software Processes; Scott Henninger, Department of Computer Science & Engineering; Appears in International Conference on Software Reuse, pp. 103-112, 1998. (10 pages total).

(Continued)

*Primary Examiner* — Lewis A Bullock, Jr.
*Assistant Examiner* — Mark Gooray
(74) *Attorney, Agent, or Firm* — Dan Choi; Brian Haslam; Micky Minhas

(57) ABSTRACT

The present invention extends to methods, systems, and computer program products for allowing a computer system user to extend the functionality of a data-centric software application. The method includes instantiating the data-centric software application, where the data-centric application has portions of business logic categorized and associated with items of data-centric application functionality defined in a schema. The method includes receiving customization input to customize at least one of the portions of business logic. The method includes formulating a representative model corresponding to at least one of the portions of customized business logic. The method includes applying the representative model to the schema to generate a customized schema that extends the business logic of the data-centric software application. The method includes instantiating the data-centric software application in accordance with the customized schema to customize the functionality of the business logic in the data-centric software application.

16 Claims, 2 Drawing Sheets

(56) References Cited

OTHER PUBLICATIONS

Building multi-device, adaptive thin-client web user interfaces with Extended Java Server Pages; John Grundy and Wenjing Zou, 2002 (15 pages total).

Making Work Flow: On the Application of Petri nets to Business Process Management; W.M.P. van der Aalst (20 pages total).

Rich Internet Applications; Technical Comparison and Case Studies of AJAX, Flash, and Java based RIA, Tom Noda & Shawn Helwig, Nov. 16, 2005 (10 pages total).

Say Goodbye to Portal Servers, Interaction Platforms and App Server Platforms Take Over by Nate L. Root with Connie Moore and Lucy Fossner, Mar. 24, 2005 (11 pages total).

* cited by examiner

USER-CUSTOMIZED EXTENSIONS FOR SOFTWARE APPLICATIONS

BACKGROUND

Computer systems and related technology affect many aspects of daily life in society. Computer systems commonly perform a great variety of tasks (e.g., word processing, scheduling, database management, etc.) that aid in work and business productivity. Such tasks are generally accomplished by processing functions within software applications.

Generally, software application developers design software applications to provide a certain type of functionality. For example, some applications are tailored to word processing; other applications are tailored to data management. Often, users of such software applications desire to tailor the functionality of the application to their specific needs. For example, a user of a data management application may desire to add form processing functionality that was not included in the original application. Such a user could, optionally, pay for a systems integrator to come to the user's office and reconfigure or extend the application to include the desired functionality. Alternatively, if the user's company was large enough to have an IT department, the user could ask his or her IT manager to code in the additional functionality. This may, of course, require a great deal of time from an already busy IT manager. As a last option, the user may opt to write the extension themselves, assuming the user has sufficient knowledge and available time to dedicate to such a task.

In addition to the resource requirements, allowing users to create their own application extensions can be problematic. Many users have neither the time nor the savvy to write a fully functionally application extension. Furthermore, once completed, the extension may only be configured to work on that particular user's computer system. This creates portability problems if other users want to use the extension. For these reasons, many software developers have attempted to allow users to modify their applications without having to write code.

To accomplish this, the developer can do at least one of two things: 1) implement a code generator, where a user inputs or selects a set of rules to be followed when certain actions are performed and the code generator generates the corresponding code for the application extension, or 2) implement a model engine approach where a model of the extension is turned into an object tree such that each object corresponds to the model and the model engine is able to execute the object tree.

The first approach (code generation) has several limitations. For example, it may be difficult to determine which portion of generated code relates to which part of the model. Thus, if a user wanted to use only part of the extension's functionality, it may be difficult to determine which portion to use. Furthermore, when changes are made to the model, the code for the entire extension has to be regenerated which may introduce undesirable processing delays. The second approach (model engine), although widely implemented, is still of limited use. Generally, model engines are only used for relatively simple things such as modeling workflows and corporate business policies. Providing users with the ability to extend and modify applications without using code has proved to be a difficult task.

BRIEF SUMMARY

The present invention extends to methods, systems, and computer program products for user-customized extensions for software applications. In some embodiments, a computer system performs a method for allowing a computer system user to extend the functionality of a data-centric software application. The method includes instantiating the data-centric software application, where the data-centric application has portions of business logic categorized and associated with items of data-centric application functionality defined in a schema. The method includes receiving customization input to customize at least one of the portions of business logic. The method includes formulating a representative model corresponding to at least one of the portions of customized business logic. The method includes applying the representative model to the schema to generate a customized schema that extends the business logic of the data-centric software application. The method includes instantiating the data-centric software application in accordance with the customized schema to customize the functionality of the business logic in the data-centric software application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
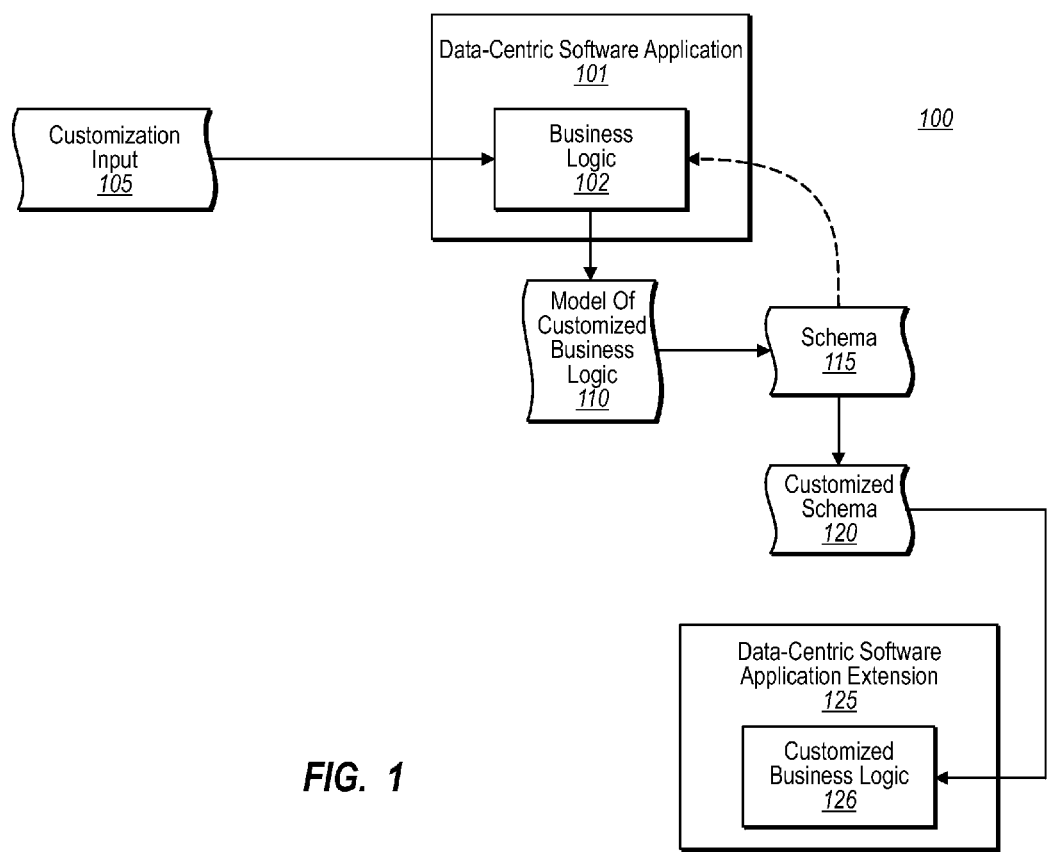
FIG. 1 illustrates a computing environment in which embodiments of the present invention may operate including allowing a computer system user to extend the functionality of a data-centric software application.

The present invention extends to methods, systems, and computer program products for user-customized extensions for software applications. In some embodiments, a computer system performs a method for allowing a computer system user to extend the functionality of a data-centric software application. The method includes instantiating the data-centric software application, where the data-centric application has portions of business logic categorized and associated with items of data-centric application functionality defined in a schema. The method includes receiving customization input to customize at least one of the portions of business logic. The method includes formulating a representative model corresponding to at least one of the portions of customized business logic. The method includes applying the representative model to the schema to generate a customized schema that extends the business logic of the data-centric software application. The method includes instantiating the data-centric software application in accordance with the customized schema to customize the functionality of the business logic in the data-centric software application.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an environment 100 in which the principles of the present invention may be employed. The environment 100 includes data-centric software application 101. Software applications are programs that allow a user to interface with and perform tasks on a computer system. Data-centric software applications are applications that allow a user to interact with data in many different ways. For example, data-centric applications may allow a computer user to incorporate data into a form, display data in a graph or a chart, categorize and/or label different portions of the data, develop workflows based on the data, or any other data-related task. Once instantiated, a software application (data-centric or otherwise) may perform functions and each function may utilize one or more portions of business logic 102 during the performance of a function.

In some embodiments, business logic 102 may reference a number of different things such as data validation (rules that control software application updates), data integrity (rules that control what happens after software updates), synchronized updates, data snapshots, audits and logs, form flow, user authorization (at row, column, and action level), task flow (i.e. flow of a work process), conditional formatting that controls what users see in a form, based on data or workflow state, policies that determine allowable discretionary actions and automatic actions based on data or workflow state or other means of controlling functionality of a data-centric software application.

For example, in data-centric software application 101, business logic 102 may include user-selectable rules that define which actions will be taken when certain situations arise. For instance, if a T-shirt company was using data-centric application 101, a business logic rule may state that a record change should take place on Form A on the order date for all shirts sold to Customer Z. Similarly, data-centric application 101's business logic 102 may dictate that the application is to display a warning if the promised delivery date is less than five days after the order date. These examples illustrate business logic 102 such as data validation, data integrity, policies, and other application behaviors that may be customized in business logic 102. These examples are meant to be illustrative and should not be construed to limit the various forms of business logic 102 that may be embodied in a data-centric software application (e.g. application 101). Additional examples of customizing business logic 102 within a data-centric software application may be found below.

Environment 100 also includes a schema 115 which defines business logic 102. In some embodiments, the schema 115 may contain rules, instructions, and/or operating conditions that define how the business logic 102 runs in data-centric application 101. In other words, schema 115 stores the information and rules used to formulate business logic 102.

In some embodiments, business logic 102 may be modified by customization input 105. For instance, a computer user may enter customization input into the computer system which may be used to alter and customize the business logic. As mentioned above, it is often desirable (or sometimes necessary) for a computer system user to extend the functionality of the data-centric software applications they use. In some embodiments, the user may change business logic 102 by entering commands and/or by selecting new forms or types of available business logic 102. In some cases, data-centric application 101 may present multiple business logic options, for example, in a drop-down menu, from which the user may select one or more business logic options.

Environment 100 also includes a model of customized business logic 110. In some embodiments, model 110 may be representative of business logic 102. In cases where a computer user has entered customization input 105 and business logic 102 has been customized, model 110 represents customized business logic 102. This model of customized business logic may be applied to schema 115 to generate customized schema 120. Customized schema 120, similar to schema 115, defines customized business logic 126. Customized schema 120 may contain rules, instructions, and/or operating conditions that define how customized business logic 126 runs in data-centric software application extension 125. Application extension 125 may extend the business logic 102 of data-centric software application 101. In this manner, data-centric application 101's business logic 102 may be extended without the computer user (or any other person) having to write code. The method for allowing a computer system user to extend the functionality of a data-centric software application will be explained further below.

Figure 2:
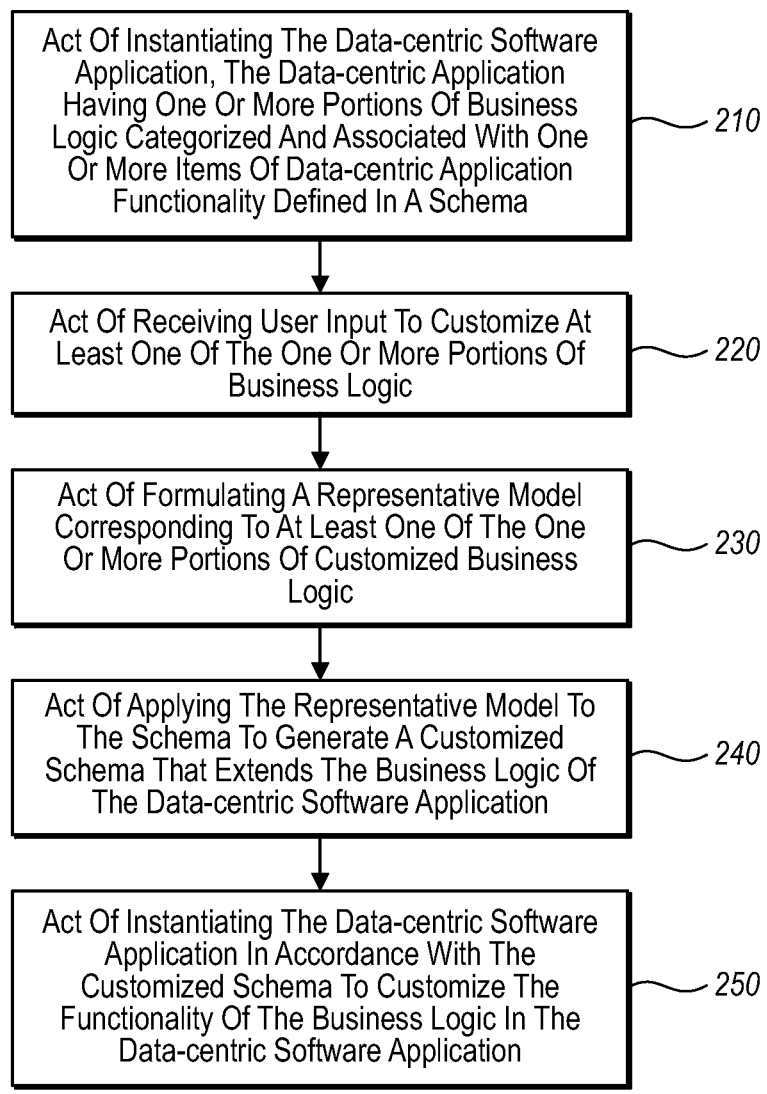
FIG. 2 illustrates a flowchart of a method for allowing a computer system user to extend the functionality of a data-centric software application.

FIG. 2 illustrates a flowchart of a method 200 for allowing a computer system user to extend the functionality of a data-centric software application. The method 200 will now be described with frequent reference to the components and data of environment 100.

Method 200 includes an act of instantiating a data-centric software application, the data-centric application having one or more portions of business logic categorized and associated with one or more items of data-centric application functionality defined in a schema (act 210). For example, a computer system may instantiate data-centric software application 101, where data-centric application 101 has one or more portions of business logic 102 categorized and associated with one or more items of data-centric application functionality defined in schema 115. As explained above, schema 115 may be used to store the information and rules that comprise business logic 102. For example, schema 115 may contain rules, instructions, and/or operating conditions that define how the business logic 102 runs in data-centric application 101.

As explained above, business logic 102 may include various types of data-centric application behavior. In some embodiments, business logic 102 may include rules and actions to guard and/or impose data quality. For example, validation within the scope of a record, a view or a workflow, integrity requiring consequential actions after some data is changed, and/or synchronization updates involving copying of data from one table to another. Business logic 102 may also include rules and actions to conditionally format a form's user interface (UI). For example, depending on the state of the data, add, show, and/or hide elements in the form, format based on validation and/or authorization rules. Business logic 102 may also include rules to enable navigation and filtering in a form, including cascading choices and filtered lookups, and conditionally enabling and/or showing queries and views in a form.

In some embodiments, Business logic 102 may include rules on form and task flow (i.e. how forms are used in sequence or in a set, based on state rules). Furthermore, business logic 102 may include invoking of actions (e.g. the conditional showing and/or invoking of actions), authorization policies (e.g. row and column level policies based on user and data state), offline policies (e.g. restrictions on what can be done offline), and/or referential integrity (e.g. ensuring there are no orphan processes, related entries are cascade deleted, etc.) or any other form of application behavior. Two examples of using business logic (e.g. 102) in a data-centric software application (e.g. 101) are included below. It should be noted that these examples are provided for illustrative purposes only and do not limit the scope of the invention.

The first example is a situation where a company (e.g. Company Y) needs to manage their inventory. Company Y may, for example, use business logic 102 within data-centric software application 101 to manage their inventory. Some of the business logic 102 may be as follows:

Conditional formatting: highlight all inventory items where the stock is below the "reorder" level.
Validation: when inventory is being withdrawn, the quantity must be<32 the stock.
Integrity: when a product item is deleted from the application, the record of stock in and out transactions is also marked as deleted (can be a soft delete).
Workflow and Synch Update: when stock of an item falls below the reorder level, create a purchase order, copy into it product details, and commit.

The second example is a situation where a company (e.g. Company Y) needs to manage their customer and order forms. Company Y also creates subsidiary forms for invoices, shipping, contracts, product details, and other items. The business logic (e.g. 102) may be as described below:

Validation: if contact type is not equal to "individual," user must fill in company name.
Integrity: customer type should be filled in with a valid customer type, and cannot be null.
State-based Formatting: enable company name if customer type is not equal to "individual."
Navigation: exclusive filter: customer name, filter: customer type
Workflow: to add an order, go to order form in add mode, return, and query; to add a customer, go to another instance of the same form, return, and query.

Business logic 102 may also include user-created rules. Furthermore, these rules may be propagated throughout data-centric application 101. In some embodiments, business logic 102 may be categorized in the form of declarative macros. Declarative macros, as used herein, are portions of business logic 102. For example, if a user was creating a form with data-centric software application 101, and part of the business logic 102 was for the form to highlight boxes that had not been filled out and validate the data in the boxes that had been filled out, one declarative macro might be instructions for the data-centric application 101 to highlight un-filled boxes. Another declarative macro might be instructions for data-centric application 101 to validate the data in filled boxes. Declarative macros may be associated with one or more information items via one or more data organization items. Information items, for example, may include data, forms, data plus forms, form region, task, workflow, user or role. Organization items, for example, may include forms, data structures, workflow descriptions or organization structures. Thus, in some embodiments, declarative macros may be associated with data and/or tasks, for example, via data structures and/or workflow descriptions. Business logic 102 may be metadata stored in XML form.

Method 200 includes an act of receiving customization input to customize at least one of the one or more portions of business logic (act 220). For example, business logic 102 within data-centric software application 101 may receive customization input 105. In some embodiments, a computer user may enter customization input 105 in order to customize the functionality of business logic 102. As in the above examples, business logic 102 may be customized according to the user's needs. Furthermore, the customized business logic may be promulgated throughout the entire data-centric application, as will be explained below.

Method 200 includes an act of formulating a representative model corresponding to at least one of the one or more portions of customized business logic (act 230). For example, a computer system may formulate a model of customized business logic 110 corresponding to at least one of the one or more portions of business logic 102 customized according to customization input 105. In some embodiments, Model 110 may represent all of business logic 102 customized according to customization input 105, or alternatively, model 110 may represent only the changes to business logic 102 made according to customization input 105.

Method 200 includes an act of applying the representative model to the schema to generate a customized schema that extends the business logic of the data-centric software application (act 240). For example, a computer system may apply model of customized business logic 110 to schema 115 to generate customized schema 120 that extends business logic 102 within data-centric software application 101. Customized schema 120, similar to schema 115, may contain all the rules, instructions, and/or operating conditions that define how customized business logic 126 runs in data-centric software application extension 125. In other words, customized schema 120 may store all the information and rules that comprise customized business logic 126.

Method 200 also includes an act of instantiating the data-centric software application in accordance with the customized schema to customize the functionality of the business logic in the data-centric software application (act 250). For example, a computer system may instantiate data-centric software application extension 125 in accordance with customized schema 120 to customize the functionality of customized business logic 126 in data-centric software application extension 125. In some embodiments, data-centric software application extension 125 may include custom actions, expressions, and Web service bindings. Custom actions, for example, may include user-defined rules or actions that were incorporated into extension 125. Expressions and Web service bindings, are also examples of various types of data structures, configurations, and presentations methods that can be incorporated and customized in customized business logic 126 within data-centric software application extension 125. In some embodiments, a computer user may use data-centric software application extension 125 to generate a form based on customized business logic 126.

As mentioned above, business logic 102 may include any type of application behavior or method of manipulating data. Thus, data-centric software application extension 125 may extend the functionality of data-centric software application 101 by incorporating different types of business logic (i.e. customizing the business logic) including various types of application behavior. A computer user may thus be able to alter and/or extend the functionality of a software program without having to write code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system, a computer-implemented method of extending the functionality of a data-centric software application without requiring a user of the data-centric software application to write code for the extended functionality, the method comprising acts of:
    at one or more storage media of the computing system, instantiating a data-centric software application for execution by one or more processors of the computing system, the data-centric application comprising,
        business logic comprised of information and rules that define certain functionality in the form of actions that will be taken when certain situations arise, and
        a schema for storing the information and rules defining the business logic categorized and associated with items of data-centric application functionality; and extending the functionality of business logic without requiring a user to write code for the extended functionality, by performing the following further acts:
    receiving from a user of the computing system customization input that requires extending new functionality to at least one or more portions of the business logic, the customization input comprising rules on each of task flow, authorization policies, offline policies and referential integrity;
    the one or more processors formulating a representative model corresponding to the customization input received for the at least one or more portions of the business logic;
    the one or more processors applying the representative model to the schema to generate a customized schema that extends the business logic of the data-centric software application consistent with the customization input received from the user, such that the customized schema comprises rules, instructions, and operating conditions that define how the extended business logic runs in the data centric software application extended in accordance with the customization input received from the user; and
    instantiating at the one or more storage media of the computing system the data-centric software application in accordance with the customized schema so that functionality of the business logic in the data-centric software application is extended to include the new functionality required by the user's customization input.

2. The method of claim 1, wherein the business logic is categorized in the form of declarative macros.

3. The method of claim 2, wherein the declarative macros are associated with one or more information items via one or more data organization items.

4. The method of claim 3, wherein the one or more information items comprise data, forms, data plus forms, form region, task, workflow, user or role.

5. The method of claim 3, wherein data organization items comprise forms, data structures, workflow descriptions or organization structures.

6. The method of claim 1, wherein the business logic is metadata stored in the form of an XML schema.

7. The method of claim 1, wherein the customization input includes custom actions, expressions, and Web service bindings.

8. The method of claim 1, wherein the one or more processors of the computing system use the extended functionality of the business logic to generate a form.

9. A computer program product for use at a computer system, the computer program product implementing a method of extending the functionality of a data-centric software application without requiring a user of the data-centric software application to write code for the extended functionality, the computer program product comprising:
    one or more computer-readable storage memory having stored thereon computer-executable instructions that, when executed by one or more processors of the computer system, cause the computer system to perform the following:
        at one or more storage media of the computing system, instantiating a data-centric software application for execution by one or more processors of the computing system, the data-centric application comprising,
            business logic comprised of information and rules that define certain functionality in the form of actions that will be taken when certain situations arise, and a schema for storing the information and rules defining the business logic categorized and associated with items of data-centric application functionality; and extending the functionality of the business logic without requiring a user to write code for the extended functionality, by performing the following further acts:

receiving from a user of the computing system customization input that requires extending new functionality to at least one or more portions of the business logic, the customization input comprising rules on each of task flow, authorization policies, offline policies and referential integrity;

the one or more processors formulating a representative model corresponding to the customization input received for the at least one or more portions of the business logic;

the one or more processors applying the representative model to the schema to generate a customized schema that extends the business logic of the data-centric software application consistent with the customization input received from the user, such that the customized schema comprises rules, instructions, and operating conditions that define how the extended business logic runs in the data centric software application extended in accordance with the customization input received from the user; and instantiating at the one or more storage media of the computing system the data-centric software application in accordance with the customized schema so that functionality of the business logic in the data-centric software application is extended to the new functionality required by the user's customization input.

10. The computer program product of claim 9, wherein the business logic is categorized in the form of declarative macros.

11. The computer program product of claim 10, wherein the declarative macros are associated with one or more information items via one or more data organization items.

12. The computer program product of claim 11, wherein the one or more information items comprise data, forms, data plus forms, form region, task, workflow, user or role.

13. The computer program product of claim 11, wherein data organization items comprise forms, data structures, workflow descriptions or organization structures.

14. The computer program product of claim 9, wherein the business logic is metadata stored in the form of an XML schema.

15. The computer program product of claim 9, wherein the customization input includes custom actions, expressions, and Web service bindings.

16. The computer program product of claim 9, wherein the tne or more processors of the computing system use the extended functionality of the business logic to generate a form.

* * * * *